Figure 1:
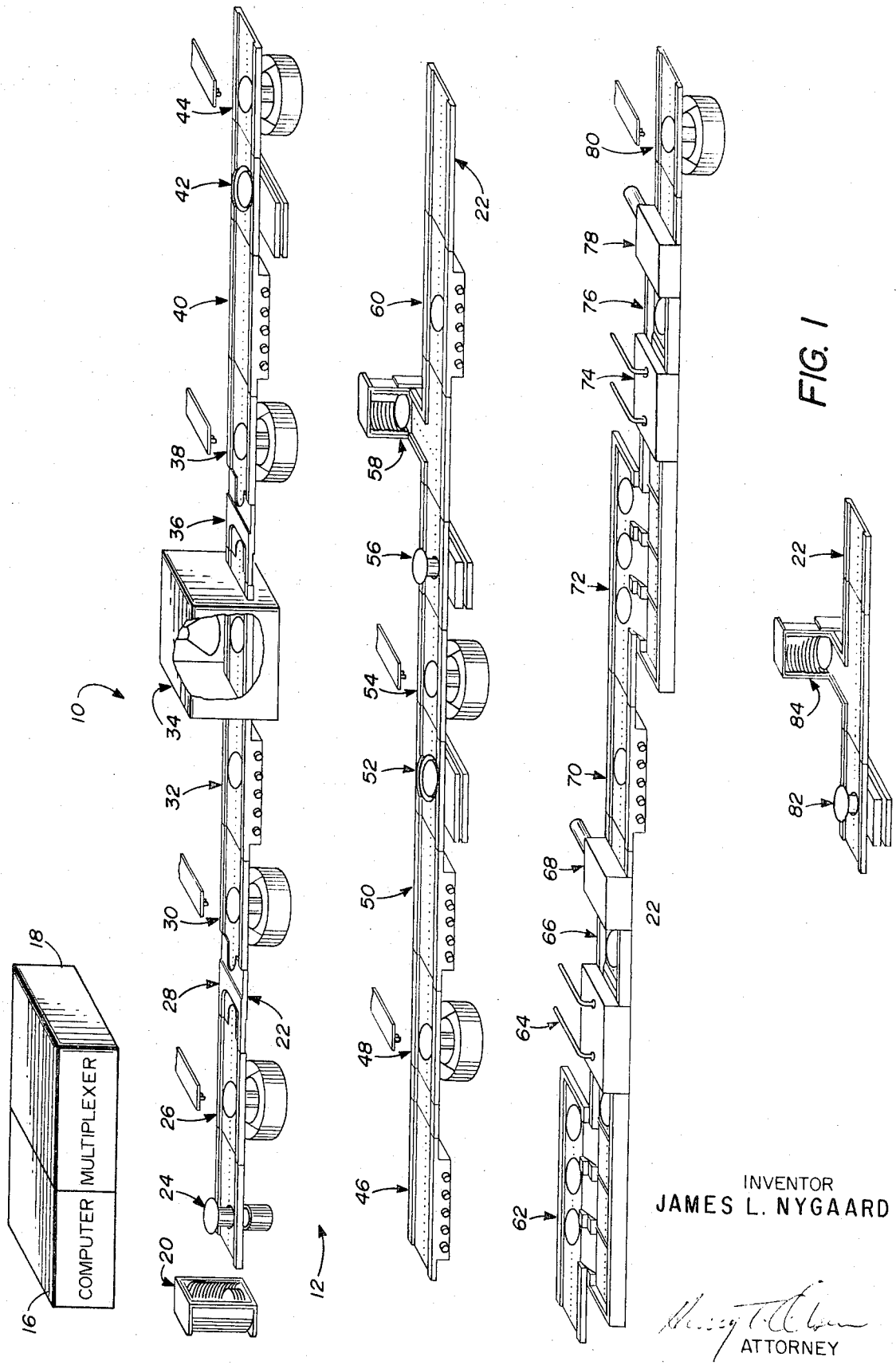

United States Patent [19]
Nygaard

[11] 3,765,763
[45] Oct. 16, 1973

[54] AUTOMATIC SLICE PROCESSING
[75] Inventor: James L. Nygaard, Richardson, Tex.
[73] Assignee: Texas Instruments Incorporated, Dallas, Tex.
[22] Filed: July 29, 1969
[21] Appl. No.: 845,733

[52] U.S. Cl................ 355/100, 118/62, 118/48
[51] Int. Cl. .......................................... G03b 27/30
[58] Field of Search................ 198/19; 302/29; 340/172.5; 95/14, 89, 94; 355/100

[56] References Cited
UNITED STATES PATENTS

| | | | |
|---|---|---|---|
| 3,538,270 | 11/1970 | Buechner | 95/89 X |
| 2,805,898 | 9/1957 | Willis | 302/29 |
| 3,306,420 | 2/1967 | Nicolaus | 198/19 |
| 3,335,839 | 8/1967 | Neumann | 198/19 |
| 436,627 | 9/1890 | Enjalbert | 95/14 X |
| 1,967,889 | 7/1934 | Kitroser | 95/94 |
| 2,251,232 | 7/1941 | Houston | 95/94 |
| 3,338,149 | 8/1967 | Hemery | 95/89 |

Primary Examiner—John M. Horan
Attorney—James O. Dixon, Andrew M. Hassell, Harold Levine, Melvin Sharp, John E. Vendigriff, Henry T. Olsen and Michael A. Sileo, Jr.

[57] ABSTRACT

In an electronic component manufacturing system, slices are transported in serial fashion between a plurality of work stations. As the slices move through the system, each work station performs a separate manufacturing operation on each slice. The manufacturing operations are performed in immediate succession and within the same time interval so that the slices are processed rapidly and so that slices do not accumulate between the work stations. The slices are maintained in sequence throughout the system so that the operation of the system is more easily controlled.

17 Claims, 2 Drawing Figures

INVENTOR
JAMES L. NYGAARD
ATTORNEY

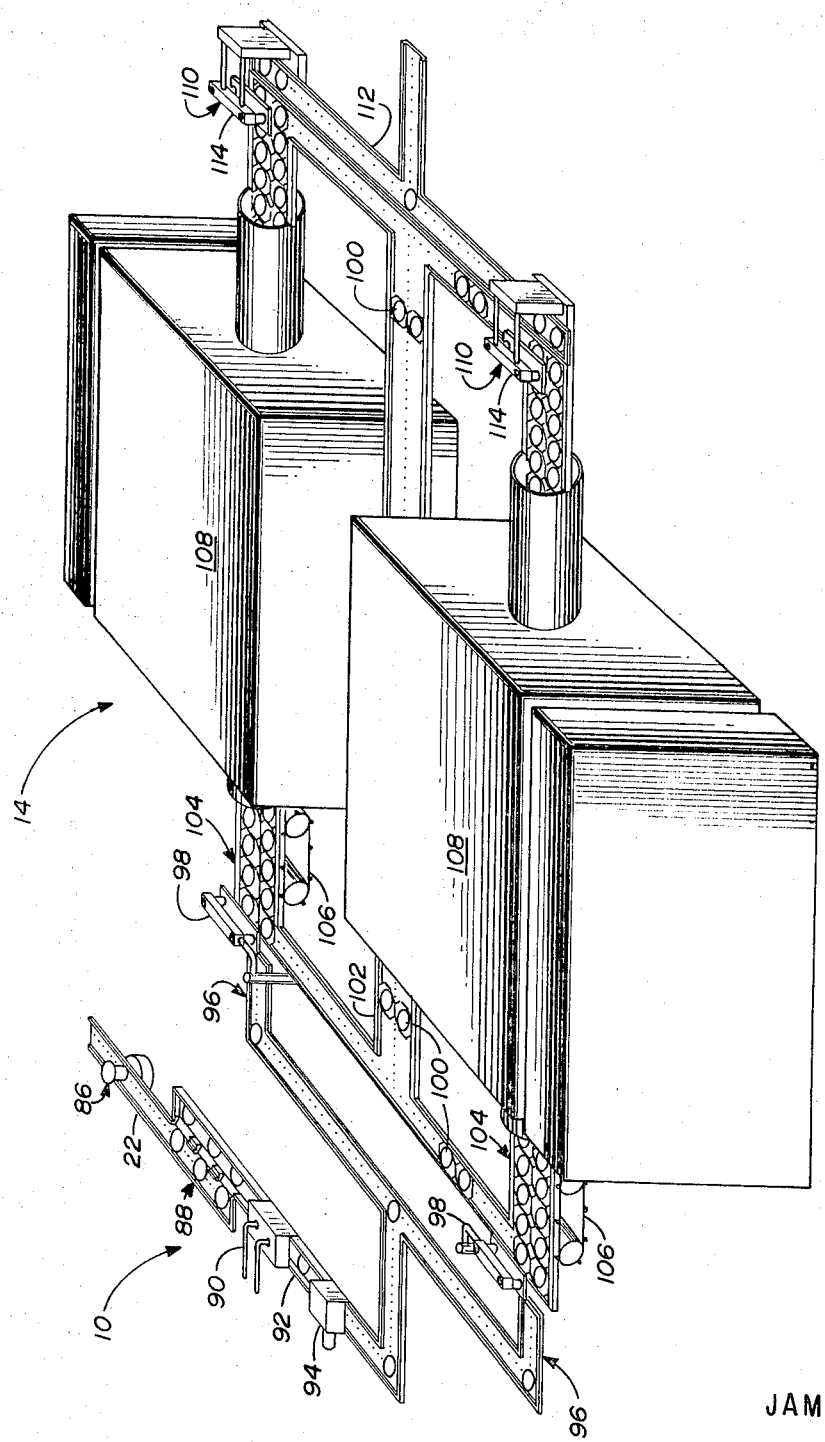

AUTOMATIC SLICE PROCESSING

In the electronic component manufacturing industry, integrated circuits and other devices are typically fabricated in the form of slices or wafers, each of which contains a large number of individual circuits. Heretofore, most slice manufacturing processes have been comprised of a succession of batch processing operations. That is, slices have been manufactured by applying most manufacturing steps to a large number of slices, or batch, at one time.

The use of batch processing in the manufacture of integrated circuit slices results in several problems. One of the most important of these problems involves cycle time; that is, the total elapsed time necessary to produce a finished slice. For example, the cycle time for a typical batch processing type slice manufacturing process is 4 to 12 weeks even though the total time that each slice is actually operated upon in the process is about 6 days.

Long cycle times are undesirable in slice manufacturing processes for several reasons. For example, when the cycle time for a process is longer than the backlog of orders for products produced by the process, it is necessary to forecast product orders and to begin the production of slices based on such forecasts. If the forecast is wrong, the production of unwanted inventory results.

Even when forecasts are correct, the fact that not all quotes result in orders often necessitates the issuance of more than one quote on the same batch of work-in-process. Then, if more than one quote is accepted, some customers must be informed that their order cannot be filled. Thus, long cycle times often result in customer dissatisfaction.

Long cycle times in slice manufacturing operations are undesirable for reasons other than customer relations. One such reason is inventory. Many thousands of slices may be in process at any one time in a typical batch processing operation. Also, long cycle times require a much larger finished goods inventory than would otherwise be required because customer orders cannot be filled by manufacturing slices as orders are received.

Another reason that long cycle times are undesirable is that if a system failure occurs, it may be months before the failure is detected. Likewise, a very long period of of time elapses before the effect of corrections and changes in the system are known. Often, a very large quantity of defective inventory is produced during the period between a failure and the introduction of an effective correction of the failure.

Another type of problem that results from the use of batch processing techniques in slice manufacture involves the deterioration of slices during the manufacturing process. No matter how carefully a batch processing system is planned, it is impossible to process slices through all steps of the system at the same rate. This results in an accumulation of slices between the faster and the slower portions of the system. Different times between such accumulations can often result in less uniform electrical characteristics as well.

Finally, when slices are produced by batch processing, it is virtually impossible to keep slices in sequence as they are processed. When slices get out of sequence, it is difficult to determine the exact source of manufacturing problems. Likewise, changes in process parameters do not result in clear-cut changes in the slices produced because it is impossible to determine which slices were processed in accordance with one set of parameters and which were processed under another set.

This invention relates to a continuous component manufacturing system. The system operates on slices on an individual basis and in sequence. Each process step of the system consumes exactly the same period of time and performs exactly the operation required by an individual slice without compromise due to the requirements of other slices.

The system has a maximum cycle time of 6 days. Thus, slices can be manufactured virtually on an as-ordered basis. The process steps of the system follow each other immediately so that the slice-in-process inventory of the system is wholly comprised of slices actually being operated upon. And, the system processes slices in exact sequence so that system failures can be easily traced and the effect of changes in the system parameters can be easily determined.

In accordance with the preferred embodiment, this invention comprises a component manufacturing system in which slices are transported in serial fashion between a series of work stations each of which performs a separate manufacturing operation on the slices. Preferably, the slices are positioned and maintained in sequence as they are transported and the work stations perform their respective manufacturing operations within a predetermined period of time.

A more complete understanding of the invention may be had by referring to the following detailed description when taken in conjunction with the drawing, wherein:

FIG. 1 is a schematic illustration of a portion of a manufacturing system employing the invention, and FIG. 2 is a schematic illustration of another portion.

Referring now to the drawings, an electronic component manufacturing system employing the invention is schematically illustrated. The system 10 comprises a representative portion of a larger component manufacturing system which operates to automatically fabricate silicon planar devices such as integrated circuits, transistors, resistors and related electronic components. These products are produced in the form of slices or wafers each containing relatively large numbers of individual components.

The manufacturing system 10 illustrated in the drawings, and the overall system of which it forms a part, differs from prior electronic component manufacturing systems in that it forms component slices on a continuous basis. In the system 10, individual slices are transported between a plurality of work stations, each of which performs an individual manufacturing operation on each slice. The slices are numbered and are operated upon in sequence throughout the entire system. Each work station of the system performs its respective manufacturing operation within an optimum period of time so that slices do not accumulate at any point in the system.

The system 10 also differs from prior component manufacturing systems in that it is entirely computer controlled. Thus, a computer is connected to the slice transporting portion of the system and operates to regulate the movement of slices to and from each of the work stations of the system. The work stations in the system are mechanically, electrically and chemically self-contained and are independently replaceable.

However, the work stations lack the timing, sequencing and control systems which are ordinarily included in slice processing machines. The functions normally performed by these systems are performed by the computer which regulates the initiation, the progress and the termination of every operation performed by every work station in the system. The computer is in turn controlled by a deck of instruction cards so that the manufacturing processes performed by the system 10 can be adjusted, altered or completely changed by simply changing the instruction in the cards contained in the deck. One presently available computer suitable for use as the control computer of the present invention is the IBM 1,800 process control computer now in wide use. Another process control computer suitable for use in the present invention is disclosed in copending U.S. Pat. application Ser. No. 178,804 filed Sept. 8, 1971 which is a continuation of U.S. Pat. application Ser. No. 843,614 (now abandoned), filed July 22, 1969 by George P. Shuraym for Multi-mode Process Control Computer with Bit Processing and assigned to the assignee of the present application.

Referring now to FIGS. 1 and 2, the system 10 includes a dark-room module 12 which is shown in FIG. 1 and deposition module 14 which is shown in FIG. 2. The system 10 further includes a computer 16 which controls the operations of both the darkroom module 12 and the deposition module 14. The computer 16 is connected to the modules 12 and 14 by a multiplexer 18 which repeatedly interconnects the computer 16 and each portion of the modules 12 and 14 in rapid sequence.

In the operation of the system 10, slices are received by the dark-room module 12 on a one slice at a time basis from the boat 20 or other slice supplying mechanism. As received, each slice is comprised of a silicon substrate having a layer of silicon dioxide formed over one of its surfaces. The slices employed in the system 10 differ from conventional slices in that each slice is individually numbered. This is accomplished by forming a series of binary coded notches on the edge of each slice.

The slices delivered to the darkroom module 12 from the boat 20 are received by a slice transporting air track 22. The air track 22 extends through the entire module 12 and operates to transport slices in serial fashion between the various work stations of the module. The air track 22 is basically comprised of a guideway having a line of small diameter holes formed through it along its axial center. Compressed air is directed through the holes in the guideway to form jets of compressed air above the surface of the guideway. The jets support the slices on a cushion of air and propel the slices along the guideway through the darkroom module 12. Such an airtrack transport system is disclosed in copending U.S. Pat. application Ser. No. 844,918 filed July 25, 1969 by Robert G. Hagler for Transporting and Positioning System and assigned to the assignee of the present application.

Each slice received in the darkroom module 12 is initially transported by the air track 22 to a slice reading work station 24. At the work station 24, the slice is rotated relative to a lamp and photo-cell slice reading device. The slice reading device generates a signal indicative of the number encoded in the edge of the slice and transmits the signal to the computer 16 of the system 10.

The computer 16 stores the number of each slice read by the slice reading station 24 and in this manner records the sequence in which slices are introduced into the module 12. The sequence may be in any order, ascending, descending, or mixed. However, once a slice sequence is established, the sequence must be maintained throughout the system 10. If any slice in process in the system 10 gets out of sequence in any manner, the computer 16 automatically terminates the operation of the entire system.

As soon as a slice has been read at the work station 24, it is transported by the air track 22 to a slice cleaning work station 26. At the work station 26, the slice is positioned on a spindle and is secured to the spindle by the actuation of a vacuum port in the spindle. The spindle is then lowered into a chamber and is rotated at a relatively high speed. During the rotation of the spindle, a slice cleaning solution is sprayed onto the slice from a nozzle.

Every work station of the system 10 is completely controlled by the computer 16. By way of example, in the cleaning station 26 slices are not fed onto the spindle until the computer 16 determines that the spindle is ready to accept a slice and the vacuum port of the spindle is not energized until the slice is positioned on the spindle. The spindle is not lowered into the chamber until the vacuum port has secured a slice to spindle and is not rotated until it is positioned in the chamber. No cleaning solution is sprayed onto the slice until the spindle is rotating. Similarly, each and every phase of the operation of every work station in the system 10 is dependent upon the computer 16 for its initiation, control, and termination.

When a slice has been cleaned by the work station 26, it is transported by the air track 22 to a slice flipping work station 28. The sole function of the station 28 is to invert each slice processed by the system 10 relative to the air track 22. The slice 28 is controlled by the computer 16 in that slices are not admitted into the station until the station is ready to perform a slice flipping operation and in that the slice flipping operation is not started until a slice is properly positioned.

From the station 28, each slice is transported to a slice coating station 30. The station 30 is constructed identically to the slice cleaning station 26 in that it includes a slice lowering and spinning spindle having a vacuum port formed in it, a chamber and a nozzle. The station 30 functions to coat the back of each slice with a layer of a photo-resist material such as KMER.

From the work station 30, the air track 22 transports each slice to a heating work station 32. The station 32 comprises a heated section of the track 22 and operates to bake the coating of photo-resist material that was applied to the slice at the station 30.

When a slice has been heated at station 32, it is moved to an exposing station 34 wherein the coating of photo-resist material on the slice is exposed to light. The exposure of photo-resist material to light polymerizes the material into a substance that is highly resistant to attack by etching solutions. Thus, when a slice leaves the station 34, its entire back surface is coated with an etch resistant substance.

From the station 34, the air track 22 transports each slice between a slice flipping station 36, a slice spinning station 38 and a slice heating station 40. The station 36 is identical in construction and function to the station 28. Thus, as a slice leaves the station 36, the back side of the slice is engaged with the air track 22. The station 38 is identical in construction and function to station 30 and operates to apply a coating of photo-resist material to the front side of each slice passing through the system 10. The station 40 is identical in construction and function to the station 32 and operates to bake the coating of photo-resist material on the front side of the slices.

When the front side of a slice has been coated with photo-resist material, the slice is moved to an aligning and exposing work station 42. At the station 42, each slice is precisely aligned with a mask that bears a pattern corresponding to areas of the silicon dioxide coating on the silicon substrate of the slice that is to be etched. The aligned slices are exposed to light source through the mask. By this technique, light is engaged in portions of the layer of photo-resist material on the front of each slice corresponding to the portions of the layer of silicon dioxide on the slice that is not to be etched. The mask blocks light from the portions of the layer of photo-resist material corresponding to the portions of the silicon dioxide layer that are to be etched.

After a slice has been exposed at the station 42, it is transferred to a developing station 44 which is constructed identically to the stations 26, 30 and 38. At the developing station, the slice is sprayed with a material which removes the portions of the layer of photo-resist material that were not exposed to light at the station 42. That is, the portions of the layer of photo-resist material that cover the portions of the layer of silicon dioxide that are to be etched are removed.

From the developing station 44, each slice is transported by the air track 22 through a heating station 46, a coating station 48 and a heating station 50 to an align and expose station 52. The stations 46 and 50 are identical in construction and function to the station 32 and the station 48 is identical in construction and function to the station 38. The station 52 is identical to the station 42 except at the station 52, the layer of photo-resist material on the front of each slice is exposed through a mask having a slightly larger dark area than the mask that is employed at station 42. The stations 48, 50 and 52 are included in the system 10 to assure the coating of the portions of each slice that are not to be etched and to assure the exposure of the portions that are to be etched.

From the station 52, each slice is moved to a development station 54 that is identical in construction and function to the station 44. After a slice has been processed by the developing station it is moved to an inspection station 56. At the inspection station, each slice is indexed through a plurality of inspection positions under the control of the computer 16. The slice is visually inspected at each of the inspection positions. If a slice does not pass inspection, the computer 16 operates the air track 22 to direct the slice into a boat 58. If the slice does pass the inspection, the computer 16 operates the air track to direct the slice through a heating station 60 to an etching station 62.

The etching station 62 includes a tank of etching solution having a slice-transporting device mounted in it. The station 62 also includes a plurality of ramps which extend into different portions of the tank. The transporting devices move each slice through the tank at a uniform rate. Therefore, the period of exposure of each slice to the etching solution is controlled by the ramp through which the slice enters the tank. The selection of the ramp through which each slice enters the tank is controlled by the computer 16 in accordance with the requirement of each particular slice manufacturing process.

As a slice leaves the etching station 62, it is transported by the air track 22 through a rinsing work station 64. At the rinsing station the etching solution from the etching station 62 is rinsed from the slice. The slice then travels through an acetone rinsing station 66 wherein the rinsing solution from the station 64 is removed. Next, the slice is conveyed through a drying station 68 wherein the acetone from the station 66 is removed.

When a slice leaves the drying station 68, it is directed through a heating station 70 to a second etching station 72. The station 72 is identical to the station 62 in that it includes an etching tank having a transporting device mounted in it and ramps which direct slices into different portions of the tank. Again, the ramp through which the slice enters the tank of the station 72 is controlled by the computer 16.

After a slice has traveled through the station 72 it is directed through a rinse station 74, an acetone rinsing station 76 and a drying station 78 to a cleaning and drying station 80. The station 80 is constructed similarly to the station 26 and operates to apply a cleaning solution to each slice passing through the system 10. The station 80 also removes the cleaning solution by directing a jet of nitrogen against each slice.

When a slice has been cleaned and dried at the station 80, it is transported by the air track 22 to an inspection station 82 that is similar in construction and function to the station 56. Slices which do not pass inspection at the station 82 are directed by the computer 16 into a boat 84. Slices which pass inspection are transported out of the darkroom module 12 into the deposition module 14 by the air track 22.

It should be understood that the various work stations comprising the darkroom module 12 are completely self-contained and are completely independent one from the other. Insofar as possible, the work stations are constructed identically to each other and to replacement units that are constantly available should one of the work stations break down. Thus, the work stations 26, 30, 38, 44, 48, 54 and 80 are identically constructed and could be interchanged with each other without changing the function of the module 12. Likewise, the stations 32, 40, 46, 50, 60 and 70 are identically constructed as are the stations 28 and 36. Of course, many of the identical work stations contained in the module 12 perform different functions because they are differently controlled by the computer 16. It will be further understood that for different devices the modules may be arranged in a different sequence.

As each slice is transported to the deposition module 14 by the air track 22, it is initially delivered to a slice reading station 86 that is identical to the slice reading station 24 of the module 12. At the station 86, the number encoded in the edge of the slice is read and is transmitted to the computer 16. In the computer 16, the numerical sequence of the slices entering the module 14 is verified against the sequence of the slices as they entered the darkroom module 12.

After it has been read at the station 86, each slice is transported to a deglazing work station 88 which is similar to the etching work stations 62 and 72 in that it contains a plurality of ramps and a tank having a slice transporting device mounted unit. Each slice is directed down one of the ramps into the tank under the control of the computer 16. When the slice leaves the station 88, it is transported through a rinsing station 90, an acetone rinsing station 92 and a drying station 94 which are identical to the stations 64, 66 and 68 of the module 12, respectively. The stations 88 through 94 function to remove the layers of photo-resist material that protected portions of the silicon dioxide layer on the slice during the treatment of the slice in the etching stations 62 and 72.

The clean slices leaving the station 94 are transported by the air track 22 to a slice transfer station 96. At the station 96, a pivotally supported slice transferring vacuum head 98 moves the slices in pairs into slice transporting boats 100. Each of the boats 100 includes a pair of slice receiving depressions. The boats 100 are formed from quartz and operate to support and transport the slices during the deposition process.

The boats 100 are initially transported along an air track 102 to a furnace track 104. At the furnace track 104 the boats are urged by a boat nudger 106 through a deposition furnace 108. In the furnace 108, a material which bears an impurity such as boron, arsenic, phosphorus or the like is deposited onto the slices. Thus, when the slices leave the furnace 108, the entire surface of each slice, especially including the exposed portions of the silicon where the silicon dioxide layer was etched away during the processing of the slice in the module 12, is coated with a layer of impurity bearing material.

As the boats 100 leave the furnace 108, they transport the slices to a slice transferring station 110. At the station 110 the slices are removed from the boats and transferred to an air track 112 by a slidably supported vacuum actuated slice transferring head 114. When the slices have been removed from the boats 100, the boats are returned to the station 96 by the air track 102. The slices that have been removed from the boats are transferred out of the deposition module 14 by the air track 112.

It will be noted that the deposition module 14 includes identical pairs of furnaces, air tracks, transfer heads and the like. This is to assure the continuous operation of the system 10. Thus, should one of the component parts of one half of the module 14 break down, slices can immediately be processed through the other half of the module 14. And, the use of parallel slice processing assemblies permits the periodic maintenance and repair of the module 14 without disturbing the operation of the system 10.

Slices leaving the deposition module 14 are transported by the air track 112 into a diffusion module (not shown). The diffusion module is constructed similarly to the deposition module 14 but operates differently in that it functions to dispense impurities from the impurity bearing layer that was deposited on the slices in the module 14 into the material of the slices. That is, impurities from the impurity bearing layer are forced into the portions of the silicon substrates of the slices that were uncovered by etching portions of the silicon dioxide layers on the slices in the module 12. This action imparts desired changes in the semiconductive qualities to the portions of the silicon substrates that were uncovered during the etching operation.

In the complete manufacturing system of which the system 10 forms a representative portion, each slice is transported through a plurality of darkroom modules, deposition modules, and diffusion modules. Each darkroom module is similar to the module illustrated in FIG. 1 except that certain work stations may be added to or removed from a particular module in accordance with particular requirements. Also, the work stations in the various modules are operated differently under the control of the computer 16 in order to provide optimum slice processing at each work station throughout the overall system. This is particularly true of the etching work stations wherein different etching solutions are employed and wherein the slices are exposed to the solutions for different periods of time as determined by the particular oxide layer being operated upon in a particular darkroom module. Similarly, all of the deposition and diffusion modules in the overall system are similarly constructed except that the various deposition modules can be employed to apply different types of layers to the slices in accordance with particular processing requirements.

The manufacturing system according to the present invention is superior to prior systems because it processes slices in a more uniform manner. Thus, each slice is rapidly transported through the entire processing system so that it does not become contaminated while waiting to be processed. Slices are automatically transported between each work station of the system in sequence so that control over the manufacture of each slice is continuously maintained. And, since each work station operates on each slice individually, and since the manufacturing operations in the system completely are computer controlled, each slice is processed without compromise as to the requirements of other slices.

Because the system illustrated in the drawings operates continuously on an individual slice basis, the cycle time required for a slice to pass through the system is reduced to an absolute minimum. The advantages resulting from the reduction of slice processing cycle time are so numerous that the use of the system would be worthwhile even if this were the only result. For example, because every slice that is in the system at any one time is actually being processed, work-in-process inventory is reduced to an absolute minimum. Similarly, because finished slices can be produced in a relatively short time, the system can be employed to produce slices for which firm orders have been received, rather than on an anticipatory basis. Thus, investment in finished goods inventory can be significantly reduced.

In addition to reducing inventories, slice processing cycle time reduction results in the more efficient slice production. For example, system failures reveal themselves in a few days rather than after several weeks. This permits corective actions to be taken much more quickly. Also, the effect of corrective actions, both those intended to correct system failures and those intended to improve system performance, have a much faster impact on the output of the system.

In addition to processing slices in a more uniform manner and to providing low slice processing cycle times, the manufacturing system according to the present invention is superior to prior systems because it maintains slices in sequence throughout the manufacturing process. Sequential operation greatly simplifies the tracing of both the causes of system failures and the effects of system changes. Also, sequential operations permit the use of the system to test experimental procedures in that it permits rapid identification of test slices.

Although only one embodiment of the invention is illustrated in the drawings and described herein, it will be understood that the invention is not limited to the embodiment disclosed but is capable of rearrangement, modification and substitution of parts and elements without departing from the spirit of the invention.

What is claimed is:

1. A manufacturing system comprising:
   A. a plurality of semiconductor processing stations, each station performing a single manufacturing operation on individual semiconductor slices including:
      i. a first spraying work station for individually cleaning semiconductor slices;
      ii. a second spraying work station for individually coating said semiconductor slices with a photoresist material;
      iii. a heating work station for curing said photoresist material on said slices;
      iv. an aligning and exposing work station for individually aligning said semiconductor slices with a patterned mask and exposing said aligned slices to a light source through said mask;
      v. a third spraying work station for removing portions of the photoresist layer on said individual slices which portions were not exposed to light at said aligning and exposing work station; and
   B. means for conveying a series of said individual semiconductor slices along a predetermined path from work station to work station; wherein said first, second and third spraying stations include:
      i. a spindle;
      ii. means for individually positioning semiconductor slices on said spindle;
      iii. means for securing such individual semiconductor slices to said spindle;
      iv. a chamber;
      v. means for lowering said spindle including the secured semiconductor slice into said chamber;
      vi. means for rotating said spindle including the secured semiconductor slice once said spindle has been lowered into said chamber; and
      vii. a nozzle positioned in relation to said lowered spindle including the secured semiconductor slice such that a solution released from said nozzle is sprayed onto the semiconductor slice while it is rotating.

2. The system of claim 1 wherein said means for conveying and said means for positioning include means for generating an air cushion and propelling jet along said predetermined path to carry semiconductor slices from work station to work station and said means for securing includes means for generating a vacuum to overcome said air cushion and thereby secure said semiconductor slice.

3. A manufacturing system comprising:
   A. a plurality of semiconductor processing stations, each station performing a single manufacturing operation on individual semiconductor slices including:
      i. a first spraying work station for individually cleaning semiconductor slices;
      ii. a second spraying work station for individually coating said semiconductor slices with a photoresist material;
      iii. a heating work station for curing said photoresist material on said slices;
      iv. an aligning and exposing work station for individually aligning said semiconductor slices with a patterned mask and exposing said aligned slices to a light source through said mask;
      v. a third spraying work station for removing portions of the photoresist layer on said individual slices which portions were not exposed to light at said aligning and exposing work station; and
   B. means for conveying a series of said individual semiconductor slices along a predetermined path from work station to work station wherein said means for conveying includes means for generating an air cushion and propelling jet along said predetermined path to carry semiconductor slices from work station to work station and wherein each work station includes means for generating a vacuum to overcome said air cushion and thereby stop a semiconductor slice at such work station.

4. A manufacturing system comprising:
   A. a plurality of semiconductor processing stations, each station performing a single manufacturing operation on individual semiconductor slices including:
      i. a first spraying work station for individually cleaning semiconductor slices;
      ii. a second spraying work station for individually coating said semiconductor slices with a photoresist material;
      iii. a heating work station for curing said photoresist material on said slices;
      iv. an aligning and exposing work station for individually aligning said semiconductor slices with a patterned mask and exposing said aligned slices to a light source through said mask;
      v. a third spraying work station for removing portions of the photoresist layer on said individual slices which portions were not exposed to light at said aligning and exposing work station; and
   B. means for conveying a series of said individual semiconductor slices along a predetermined path from work station to work station wherein said means for conveying includes an air track having holes formed therein through which compressed air is directed to carry a semiconductor slice from work station to work station and said heating work station includes means for heating a portion of said air track.

5. A manufacturing system comprising:
   A. a plurality of semiconductor processing stations, each station performing a single manufacturing operation on individual semiconductor slices including:
      i. a first spraying work station for individually cleaning semiconductor slices;
      ii. a second spraying work station for individually coating said semiconductor slices with a photoresist material;
      iii. a heating work station for curing said photoresist material on said slices;
      iv. an aligning and exposing work station for individually aligning said semiconductor slices with a patterned mask and exposing said aligned slices to a light source through said mask;
      v. a third spraying work station for removing portions of the photoresist layer on said individual slices which portions were not exposed to light at said aligning and exposing work station;

vi. an etch tank work station, said etch tank work station including:
 a. a tank for containing an etch solution;
 b. a plurality of ramps extending from a portion of a conveyor means into different portions of said tank;
 c. means for transporting semiconductor slices through said tank at a uniform rate, said means for transporting being mounted in said tank; and
 d. means for selecting which one of said plurality of ramps a semiconductor slice is conveyed through in accordance with the requirements of each particular slice transported through said tank; and B. means for conveying a series of said individual semiconductor slices along a predetermined path from work station to work station;

6. A manufacturing system comprising:

A. a plurality of semiconductor processing stations, each station performing a single manufacturing operation on individual semiconductor slices wherein said semiconductor slices each have a plurality of binary coded notches on their respective edges, including:
 i. a slice reader work station for generating a signal responsive to the binary coded notches on said semiconductor slices as they respectively pass therethrough whereby said semiconductor slices are conveyed through said manufacturing system in their respective order;
 ii. a first spraying work station for individually cleaning semiconductor slices;
 iii. a second spraying work station for individually coating said semiconductor slices with a photoresist material;
 iv. a heating work station for curing said photoresist material on said slices;
 v. an aligning and exposing work station for individually aligning said semiconductor slices with a patterned mask and exposing said aligned slices to a light source through said mask;
 vi. a third work station for removing portions of the photoresist layer on said individual slices which portions were not exposed to light at said aligning and exposing work station; and B. means for conveying a series of said individual semiconductor slices along a predetermined path from work station to work station.

7. The system of claim 6 wherein said slice reader work station includes:
 a. an energy source;
 b. an energy sensor; and
 c. means for individually rotating said semiconductor slices relative to said energy source and energy sensor, whereby individual signals are generated responsive to the notches of said slices.

8. A manufacturing system comprising:
 a. a plurality of concurrently operating semiconductor processing stations, each station performing a single manufacturing operation on individual semiconductor slices including:
 i. a work station for individually coating semiconductor slices with a photoresist material;
 ii. a work station for curing said photoresist material on said slices;
 iii. an aligning and exposing work station for individually aligning said coated semiconductor slices with a patterned mask and exposing said aligned slices to a light source through said mark;
 iv. a developing work station for removing portions of the photoresist layer on said individual slices which portions were not exposed to light at said aligning and exposing work station; and
 b. means for conveying a series of said individual semiconductor slices along a predetermined path from work station to work station.

9. A manufacturing system comprising:

A. a plurality of semiconductor processing stations, each station performing a single manufacturing operation on individual semiconductor slices including:
 i. a work station for individually coating semiconductor slices with a photoresist material;
 ii. a work station for curing said photoresist material on said slices;
 iii. an aligning and exposing work station for individually aligning said coated semiconductor slices with a patterned mask and exposing said aligned slices to a light source through said mask;
 iv. a developing work station for removing portions of the photoresist layer on said individual slices which portions were not exposed to light at said aligning and exposing work station; and B. means for conveying a series of said individual semiconductor slices along a predetermined path from work station to work station wherein said means for conveying includes means for generating an air cushion and propelling jet along said predetermined path to carry said semiconductor slices from work station to work station and wherein each work station includes means for generating a vacuum to overcome said air cushion and thereby stop a semi-conductor slice at such work station.

10. A manufacturing system comprising:

A. a plurality of semiconductor processing stations, each station performing a single manufacturing operation on individual semiconductor slices including:
 i. a work station for individually coating semiconductor slices with a photoresist material:
 ii. a work station for curing said photoresist material on said slices;
 iii. an aligning and exposing work station for individually aligning said coated semiconductor slices with a patterned mask and exposing said aligned slices to a light source through said mask;
 iv. a developing work station for removing portions of the photoresist layer on said individual slices which portions were not exposed to light at said aligning and exposing work station; and B. means for conveying a series of said individual semiconductor slices along a predetermined path from work station to work station wherein said means for conveying includes an air track having holes formed therein through which compressed air is directed to carry said semiconductor slice from work station to work station and said work station for curing includes means for heating a portion of said air track.

11. A manufacturing system comprising:

A. a plurality of concurrently operating semiconductor processing stations, each station performing a single manufacturing operation on individual semiconductor slices including:
  i. a work station for individually cleaning said semiconductor slices prior to coating said slices;
  ii. a work station for individually coating semiconductor slices with a photoresist material;
  iii. a work station for curing said photoresist material on said slices;
  iv. an aligning and exposing work station for individually aligning said coated semiconductor slices with a patterned mask and exposing said aligned slices to a light source through said mask;
  v. a developing work station for removing portions of the photoresist layer on said individual slices which portions where not exposed to light at said aligning and exposing work station;
B. means for conveying a series of said individual semiconductor slices along a predetermined path from work station to work station.

12. A manufacturing system comprising:
A. a plurality of semiconductor processing stations, each station performing a single manufacturing operation on individual semiconductor slices including:
  i. a work station for individually coating semiconductor slices with a photoresist material;
  ii. a work station for curing said photoresist material on said slices;
  iii. an aligning and exposing work station for individually aligning said coated semiconductor slices with a patterned mask and exposing said aligned slices to a light source through said mask;
  iv. a developing work station for removing portions of the photoresist layer on said individual slices which portions were not exposed to light at said aligning and exposing work station;
  v. an etch tank work station, said etch tank work station including:
    a. a tank for containing an etch solution;
    b. a plurality of ramps extending from a portion of said conveyor means into different portions of said tank;
    c. means for transporting said semiconductor slices through said tank at a uniform rate, said means for transporting being mounted in said tank; and
    d. means for selecting which one of said plurality of ramps a semiconductor slice is conveyed through in accordance with the requirements of each particular slice transported through said tank; and
B. means for conveying a series of said individual semiconductor slices along a predetermined path from work station to work station.

13. A manufacturing system comprising:
A. a plurality of semiconductor processing stations, each station performing a single manufacturing operation on individual semiconductor slices wherein said semiconductor slices each have a plurality of binary coded notches on their respective edges, including:
  i. a slice reader work station for generating a signal responsive to the binary coded notches on said semiconductor slices as they respectively pass therethrough whereby said semiconductor slices are conveyed through said manufacturing system in their respective order;
  ii. a work station for individually coating semiconductor slices with a photoresist material;
  iii. a work station for curing said photoresist material on said slices;
  iv. an aligning and exposing work station for individually aligning said coated semiconductor slices with a patterned mask and exposing said aligned slices to a light source through said mask;
  v. a developing work station for removing portions of the photoresist layer on said individual slices which portions are not exposed to light at said aligning and exposing work station; and
B. means for conveying a series of said individual semiconductor slices along a predetermined path from work station to work station.

14. The system of claim 13 wherein said slice reader work station includes:
  a. an energy source;
  b. an energy sensor; and
  c. means for individually rotating said semiconductor slices relative to said energy source and energy sensor, whereby individual signals are generated responsive to the notches of said slices.

15. A manufacturing system comprising:
  a. a plurality of concurrently operating semiconductor processing stations, each station performing a single manufacturing operation on individual semiconductor slices including:
    i. a work station for individually coating semiconductor slices with a photoresist material;
    ii. a work station for curing said photoresist material;
    iii. an aligning and exposing work statiOn for individually aligning said semiconductor slices with a patterned mask and exposing said aligned slices to a light source through said mask;
    iv. a work station for removing portions of the photoresist layer on said individual slices which portions were not exposed to light at said aligning and exposing work station;
  b. means for conveying a series of individual semiconductor slices along a predetermined path from work station to work station; and
  c. computer means controlling all of said processing stations and said means for conveying and being programmed to regulate the initiation, progress, and termination of each operation performed on each individual slice at each process station and to regulate the progress of each individual slice along said predetermined path of said means for conveying.

16. The system of claim 15 wherein the control by said computer means of at least one of said work stations is dependent on signals to said computer means from said one work station and signals to said computer means from at least one other work station.

17. A manufacturing system comprising:
A. a plurality of semiconductor processing stations, each station performing a single manufacturing operation on individual semiconductor slices including:
  i. a work station for individually coating semiconductor slices with a photoresist material;
  ii. a work station for curing said photoresist material on said slices;

iii. an aligning and exposing work station for individually aligning said coated semiconductor slices with a patterned mask and exposing said aligned slices to a light source through said mask;

iv. a developing work station for removing portions of the photoresist layer on said individual slices which portions were not exposed to light at said aligning and exposing work station; and B means for conveying a series of said individual semiconductor slices along a predetermined path from work station to work station including means for generating an air cushion and propelling jet along said predetermined path to carry said semiconductor slices from work station to work station.

* * * * *

UNITED STATES PATENT AND TRADEMARK OFFICE
CERTIFICATE OF CORRECTION

PATENT NO. : 3,765,763
DATED : October 16, 1973
INVENTOR(S) : James L. Nygaard

It is certified that error appears in the above-identified patent and that said Letters Patent are hereby corrected as shown below:

Claim 9, line 27, the word "semi-conductor" should read --semiconductor--.

Claim 13, line 24, the word "are" should read --were--.

Claim 15, line 10, the word "statiOn" should read --station--.

Signed and Sealed this

Fourteenth Day of July 1981

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 3,765,763
DATED : October 16, 1973
INVENTOR(S) : James L. Nygaard

It is certified that error appears in the above-identified patent and that said Letters Patent are hereby corrected as shown below:

Claim 8, line 13, the word "mark" should read --mask--.

Signed and Sealed this

Seventeenth Day of November 1981

[SEAL]

Attest:

GERALD J. MOSSINGHOFF

Attesting Officer     Commissioner of Patents and Trademarks